(12) United States Patent
Eckerlein et al.

(10) Patent No.: US 6,212,731 B1
(45) Date of Patent: Apr. 10, 2001

(54) APPARATUS FOR CLEANING FLOORS

(75) Inventors: Uwe Eckerlein; Heinrich Mayer, both of Muenchwilen (CH)

(73) Assignee: Diversey Lever, Inc., Plymouth, MI (US)

(*) Notice: Subject to any disclaimer, the term of this patent is extended or adjusted under 35 U.S.C. 154(b) by 0 days.

(21) Appl. No.: 09/282,776

(22) Filed: Mar. 31, 1999

(30) Foreign Application Priority Data

Apr. 24, 1998 (EP) .................................................. 98201341

(51) Int. Cl.[7] .................................................. A47L 11/20
(52) U.S. Cl. .................. 15/320; 15/340.1; 15/340.3; 15/340.4; 15/49.1; 15/50.1; 15/98; 180/211
(58) Field of Search .................... 15/320, 340.1, 15/340.3, 340.4, 49.1, 50.1, 98; 180/211, 213–216, 409

(56) References Cited

U.S. PATENT DOCUMENTS

| | | | |
|---|---|---|---|
| 2,848,246 | * 8/1958 | Ruf | 180/409 |
| 2,874,792 | * 2/1959 | Scheuerpflug | 180/409 |
| 3,337,231 | * 8/1967 | Drake | 180/409 |
| 3,669,466 | * 6/1972 | Spence | 180/409 |
| 4,190,129 | * 2/1980 | Mary | 180/214 X |
| 5,033,763 | 7/1991 | Daenens et al. | 280/426 |
| 5,687,443 | * 11/1997 | Moore | 15/98 |
| 5,890,558 | * 4/1999 | Keegan | 15/340.1 X |

FOREIGN PATENT DOCUMENTS

| | | |
|---|---|---|
| 291 844 | 11/1988 | (EP) . |
| 662 301 | 7/1995 | (EP) . |
| 2576861 | 8/1986 | (FR) . |

\* cited by examiner

Primary Examiner—Mark Spisich

(57) ABSTRACT

An apparatus for cleaning floors having an undercarriage including front and rear axles (1,3) bearing at least one wheel (2,4) and a driver's seat. A steering mechanism is connected to one of the axles (1,3) for steering the apparatus. There are provided front cleaning element (5) near the front axle (1) for carrying out a first cleaning step and rear cleaning element (6) for carrying out a second cleaning step. The front and rear axles (1,3) are operatively connected in order to steer both axles in a predetermined relationship, such that the front and rear cleaning elements (5,6) follow substantially the same path.

7 Claims, 1 Drawing Sheet

APPARATUS FOR CLEANING FLOORS

FIELD OF THE INVENTION the present invention relates to an apparatus for cleaning floors, comprising an undercarriage including front and rear axles bearing at least one wheel, a driver's seat, steering means connected to one of said axles for steering said apparatus, front cleaning means near the front axle for carrying out a first cleaning step and rear cleaning means for carrying out a second cleaning step.

BACKGROUND OF THE INVENTION

Such apparatus is known in various embodiments. These prior art apparatus have either front axle steering or rear axle steering. In both cases the area covered by the rear cleaning means does not coincide with that of the front cleaning means if the apparatus makes a turn, for example around obstacles. This makes it necessary to move back and forth in such areas in order to complete the cleaning operation. As an alternative, the rear cleaning means can be made wider than the front cleaning means so as to obtain complete coverage by the rear cleaning means. However, this increases the total width of the apparatus making it more difficult to handle, especially in areas with obstacles which may interfere with the protruding rear cleaning means.

The object of the present invention is to remove this problem in an effective way. To obtain the object, the invention provides an apparatus according to claim 1.

SUMMARY OF THE INVENTION

Accordingly, the present invention provides an apparatus for cleaning floors, comprising an undercarriage including front and rear axles bearing at least one wheel, a driver's seat and steering means connected to one of said axles for steering said apparatus, front cleaning means near the front axle for carrying out a first cleaning step and rear cleaning means for carrying out a second cleaning step, characterized in that the front and rear axles are operatively connected in order to steer both axles in a predetermined relationship, such that the front and rear cleaning means follow substantially the same path.

DETAILED DESCRIPTION OF THE INVENTION

Due to the all wheel steering configuration of the apparatus of the invention, it is possible to allow the areas covered by the rear and front cleaning means to substantially coincide, also when the apparatus is turning through a curve. As a result of the all wheel steering the machine becomes very agile in turning, whereas the width of the rear cleaning means can be reduced, preferably to the width of the front cleaning means. Obstacles may be passed very accurately as the rear cleaning means does not protrude beyond the front cleaning means in lateral direction, while they both follow substantially the same path.

In a preferred embodiment the steering means is connected to the front axle and the rear axle is coupled to the front axle by coupling means.

This main steering through the front axle is similar to the steering of a car or bicycle and is therefore much easier to most people than rear axle steering. The most simple way to operatively connect the front and rear axles is through mechanical coupling means. However, a technically more advanced manner of coupling is through electronic, electric, hydraulic or pneumatic coupling means which enable a variable connection between the front and rear axles to further optimize the coverage of the front and rear cleaning means.

The invention will hereafter be elucidated with reference to the drawing showing an embodiment of the invention by way of example.

Figure 2:
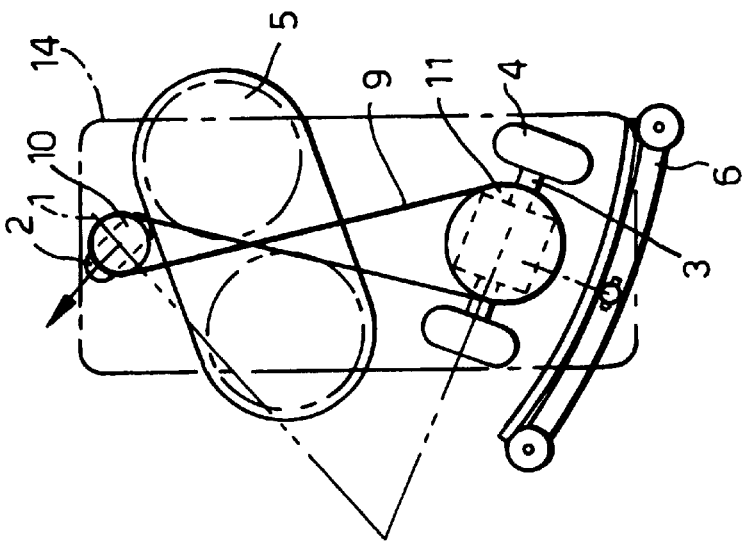
FIG. 2 is a view corresponding to that of FIG. 1 showing the mechanical connection between the front and rear axles.

The drawing shows an embodiment of an apparatus for cleaning floors, in this case for wet cleaning smooth floor surfaces, in particularly in public and utility buildings.

The apparatus comprises an undercarriage including a front axle 1, in this case supporting one front wheel 2, as well as a rear axle 3 supporting two rear wheels 4. The undercarriage carries a frame or body 14 supporting at least a driver's seat and steering means such as a steering wheel. These latter parts are not shown in the drawing, since they are known in the prior art and do not form part of the present invention. The steering means is connected to the front axle 1 so that the apparatus can be manoeuvered in a way similar to normal cars, bicycles or the like. The apparatus may be driven by an engine or electric or hydraulic motor coupled to the front or rear axle 1, 3. Alternatively, the apparatus may be brush-driven.

The cleaning apparatus is of the type carrying out two cleaning steps, including a first wetting and scrubbing step performed by front cleaning means 5, in this case positioned directly behind the front axle 1. This front cleaning means 5 may include scrubbing brushes of any kind, as well as fluid sprayers or the like to spray cleaning fluid on the floor to allow scrubbing of the floor in a wet condition. The second cleaning step is a drying step which is performed by rear cleaning means 6 positioned directly behind the rear axle 3 and including wiping and/or sucking means to squeegee the wet floor.

According to the present invention, not only the front axle 1 makes steering movements, but also the rear axle 3. This is illustrated by the angle α between the axis of the rear axle 3 and the longitudinal axis 7 of the frame, said angle α differing from 90°. The rear axle 3 moves in a direction of rotation opposite to that of the front axle 1. The rear cleaning means 6 moves in unison with the rear axle 3. The turning center 8 of the apparatus when driving through a curve is positioned in a point in between the front and rear axles 1 and 3 of the apparatus.

FIG. 2 illustrates the connection between the front and rear axles 1 and 3, which are coupled, in this case, through mechanical coupling means in the form of a flexible endless coupling member 9, such as a cable, belt, chain or the like guided in non-slipping fashion around guide wheels 10 and 11 rotatably fixed to the respective axle 1 and 3 at the position of the steering axis thereof. When the coupling member 9 is constructed as a cable or belt, the guide wheels 10 and 11 will be constructed as pulleys, whereas a chain as coupling member 9 will require the guide wheels 10 and 11 to be constructed as sprockets. In order to allow the axles 1 and 3 to counter-rotate when making a curve, the endless coupling member 9 is guided in the shape of an "8". The diameter of the guide wheels 10 and 11 are related such that a transmission ratio of the steering movements of the front and rear axles 1 and 3 is obtained with which the path followed by the rear cleaning means 6 substantially coincides with the path followed by the front cleaning means 5. The paths of the cleaning means 5 and 6 will also be determined by their position with respect to the axles 1 and 3, so that the transmission ratio should be adapted to the respective positions. For example, the front cleaning means 5 could also be positioned in front of the front axle 1 and then the transmission ratio will differ substantially from the appr. 2:1 ratio of the coupling means 9 shown in the drawing. Preferably, the steering movements of the rear axle 3 are kept to a minimum in order to minimize the disturbance of the front wheel steering feel to the driver.

Figure 1:
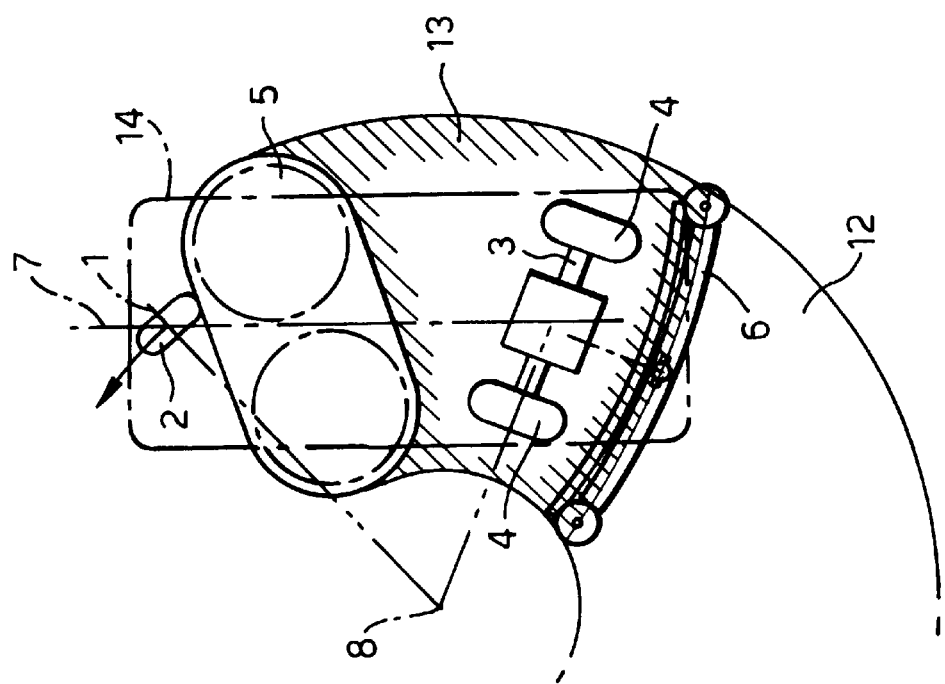
FIG. 1 is a very schematic illustration of the operation of the apparatus according to the invention, in plan view.

As is shown in FIG. 1, the sucked area 12 of the rear cleaning means 6 completely covers the scrubbed and wetted area 13 of the front cleaning means 5 when the apparatus is moving through a curve. The wetted area can thus be completely sucked dry during the same run. This is obtained with rear cleaning means 6 which is only slightly wider than the front cleaning means 5.

If the coupling means of the front and rear axles 1 and 3 is an electronic, electric, hydraulic or pneumatic coupling means (or a combination thereof) allowing a variable transmission ratio or connection between the front and rear axles 1 and 3 as a function of the steering angle, then it is possible to maintain a complete coverage of the front and rear cleaning means 5 and 6 through all kinds of curves, even if they are of equal width.

The cleaning apparatus according to the invention allows easy and complete wet cleaning of floors in a very efficient manner, whereas the apparatus can be steered very easily around obstacles since the front and rear cleaning means follow the same path.

The invention is not restricted to the embodiment shown in the drawing and described herein before, which may be varied in different manners within the scope of the invention.

What is claimed is:

1. Apparatus for cleaning a floor, comprising an undercarriage including front and rear axles (1, 3) bearing at least one wheel (2, 4), the front axle (1) being steerable, front cleaning means (5) near the front axle (1) for carrying out a first cleaning step and rear cleaning means (6) for carrying out a second cleaning step, wherein the rear axle (3) is coupled to the front axle (1) by mechanical coupling means (9) in order to steer both axles in a predetermined relationship, such that the front and rear cleaning means (5, 6) follow substantially the same path, wherein the mechanical coupling means (9) includes a flexible endless coupling member which is a cable, belt or chain and substantially parallel to the floor, and guided around front and rear guide wheels (10, 11), the front guide wheel (10) being rotatably fixed to the front axle (1) and the rear guide wheel (11) being rotatably fixed to the rear axle 3.

2. Apparatus according to claim 1, wherein the front and rear axles are operatively connected to rotate in opposite directions, and the rotation of the rear axle is less than the rotation of the front axle.

3. Apparatus according to claim 1, wherein the front cleaning means (5) is positioned behind the front axle (1), and the rear cleaning means (6) is positioned behind the rear axle (3).

4. Apparatus according to claims 1, wherein the rear cleaning means (6) follows steering movements of the rear axle (3).

5. Apparatus according to claim 1, wherein the width of the rear cleaning means (6) is substantially equal to the width of the front cleaning means (5).

6. Apparatus according to claim 1, wherein the front axle (1) supports one wheel (2) and the rear axle (3) supports two wheels (4).

7. Apparatus according to claim 1, wherein the front cleaning means (5) comprises scrubbing elements and fluid sprayers, and the rear cleaning means (6) comprises wiping elements, suction elements, or both.

* * * * *